(12) United States Patent
Ducellier et al.

(10) Patent No.: US 7,212,704 B2
(45) Date of Patent: May 1, 2007

(54) SYSTEMS AND METHODS FOR OPTICAL SWITCHING TO COLORLESS PORTS AND COLORED PORTS

(75) Inventors: Thomas Ducellier, Ottawa (CA); Alan Hnatiw, Stittsville (CA)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/247,265

(22) Filed: Oct. 12, 2005

(65) Prior Publication Data

US 2006/0078251 A1    Apr. 13, 2006

Related U.S. Application Data

(60) Provisional application No. 60/617,042, filed on Oct. 12, 2004.

(51) Int. Cl.
*G02B 6/35* (2006.01)
(52) U.S. Cl. .............................. 385/16; 385/17; 385/24

(58) Field of Classification Search ..................... None
See application file for complete search history.

(56) References Cited

U.S. PATENT DOCUMENTS

| | | | |
|---|---|---|---|
| 5,414,540 A | 5/1995 | Patel et al. | |
| 6,778,739 B1* | 8/2004 | Jerphagnon et al. | 385/52 |
| 2003/0012486 A1* | 1/2003 | Ducellier et al. | 385/17 |
| 2004/0151426 A1 | 8/2004 | Boertjes et al. | |
| 2004/0252938 A1 | 12/2004 | Ducellier et al. | |
| 2006/0133723 A1* | 6/2006 | Tian et al. | 385/18 |

* cited by examiner

*Primary Examiner*—Sung Pak
*Assistant Examiner*—Tina M. Wong
(74) *Attorney, Agent, or Firm*—Teitelbaum & MacLean; Neil Teitelbaum; Doug MacLean

(57) ABSTRACT

A wavelength selective switch is provided with a multiplexer such that both colourless (wavelength non-specific) and coloured (wavelength specific) ports are available. A waveguide device is employed with dispersive elements having different characteristics to realize the colourless and coloured ports within one waveguide device.

34 Claims, 10 Drawing Sheets

SYSTEMS AND METHODS FOR OPTICAL SWITCHING TO COLORLESS PORTS AND COLORED PORTS

CROSS-REFERENCE TO RELATED APPLICATION

This application claims the benefit of prior U.S. Provisional Application Ser. No. 60/617,042 filed Oct. 12, 2004.

FIELD OF THE INVENTION

The invention relates to wavelength selective switches and integrated optical waveguides.

BACKGROUND OF THE INVENTION

Wavelength selective switches typically have one or more input ports and one or more output ports and are capable of routing each of a number of wavelengths from any input port to a selected output port. In some wavelength selective switches, the output ports are not wavelength specific and any wavelength can be routed to any output. These output ports are referred to as "colourless". In other wavelength selective switches, the output ports are wavelength specific. These output ports are referred to as "coloured". In these devices, only one particular wavelength can be routed to each output port.

Conventionally, in order to have both colourless and coloured output ports, two separate switching devices were required.

SUMMARY OF THE INVENTION

Accordingly, the present invention relates to an apparatus comprising:
an input port for launching an input signal including a plurality of wavelength channels;
an input dispersive element for demultiplexing the input signal into wavelength channels;
at least one colourless output port, each colourless output port for outputting a respective multiplexed output signal containing a combination of all wavelength channels switched to that colourless output port;
at least one output dispersive element, each outgoing dispersive element for multiplexing the wavelength channels switched to a respective colourless output port into respective multiplexed output signals;
a plurality of coloured output ports, each for outputting only a respective predetermined demultiplexed wavelength channel switched to that coloured output port;
an optical element associated with the plurality of coloured output ports;
a wavelength selective arrangement adapted to selectively switch each of the plurality of wavelengths of the input signal to a respective one of:
a) the at least one output dispersive element for multiplexing the selected wavelengths, and directing the multiplexed output signal to a selected colourless output port;
b) the optical element, which then routes the demultiplexed wavelength to the coloured output port of the plurality of coloured output ports that outputs that wavelength.

Another aspect of the present invention relates to an integrated optical waveguide device comprising:
an input arrayed waveguide having a first dispersion for launching an input signal including a plurality of wavelength channels;
a plurality of first output arrayed waveguides each having substantially the first dispersion;
for each of the plurality of first output arrayed waveguides, a respective first integrated optics coupling element adapted to couple light between the output arrayed waveguide and a respective colourless output port;
a second output arrayed waveguide having a second dispersion differing from said first dispersion;
for the second output arrayed waveguide, a second integrated optics coupling element adapted to couple light between the second output arrayed waveguide and a plurality of coloured output ports;
a plurality of routing elements for directing the wavelength channels from the input signal dispersed by the input arrayed waveguide to the first or second output arrayed waveguides;
wherein, for each first output arrayed waveguide, the wavelength channels directed thereto are multiplexed and output the respective colorless output port; and
wherein the first dispersion and the second dispersion differ enough such that after passing through the input arrayed waveguide, the second output arrayed waveguide and the second integrated optics coupling element, selected wavelength channels have a physical separation such that each wavelength channel is coupled to a respective one of the plurality of coloured output ports.

According to another aspect of the present invention an apparatus comprises:
an input optical port for receiving an input optical signal including a plurality of wavelength channels;
at least one colourless output optical port;
at least one coloured output optical port;
an incoming dispersive element optically connected to the input optical port for demultiplexing the input optical signal;
at least one outgoing dispersive element optically connected to the at least one colourless output optical port for multiplexing selected wavelength channels;
a bulk optical element having optical power;
a plurality of reflective routing elements;
wherein for each wavelength channel:
the incoming dispersive element and the bulk optical element disperses the wavelength channel towards a respective one of said plurality of routing elements, and the respective one of said plurality of routing elements directs the wavelength channel via the bulk optical element to a selected colourless output port via the respective outgoing dispersive element of the selected colourless output port or to a selected coloured output port, the selected colourless output port or coloured output port being determined by the respective routing element;
whereby wavelength channels routed to a given colourless output port are re-combined into a single multiplexed output signal for output the colourless port, and each wavelength channel routed to a given coloured output port remains demultiplexed and appears at the wavelength specific coloured port.

Another feature of the present invention relates to an arrangement comprising:
at least one input port, at least one input dispersive element associated with the at least one input port;
at least one colourless output port, at least one output dispersive element being associated with the at least one colourless output port;
at least one set of coloured output ports;
at least one bulk optical element;

for each of a set of wavelength channels, a respective switching element adapted to redirect the wavelength channel; wherein the dispersive elements, the at least one bulk optical element and the switching elements are arranged to:

demultiplex wavelength channels received at the at least one input port;

redirect each wavelength channel towards one of a selected colourless output port or a selected set of coloured output ports;

for each colourless output port, remultiplex any wavelength channels routed towards the colourless output port; for each set of coloured output ports, output wavelength channels individually without remultiplexing.

Another aspect of the present invention relates to a method comprising:

using an input dispersive element, demultiplexing a multi-wavelength input signal into a plurality of wavelength channels; using a combination of switching elements and at least one bulk optical element, routing each of the plurality of wavelength channels to: a selected one of a plurality of colourless output ports via a dispersive element associated with the selected colourless output port; or a selected set of at least one set of coloured output ports;

wherein for each colourless output port, any wavelengths routed to the colourless output port are combined to produce a colourless output;

wherein for each set of coloured output ports, any wavelengths routed to the set of coloured output ports are output on wavelength channel specific output ports of the set.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
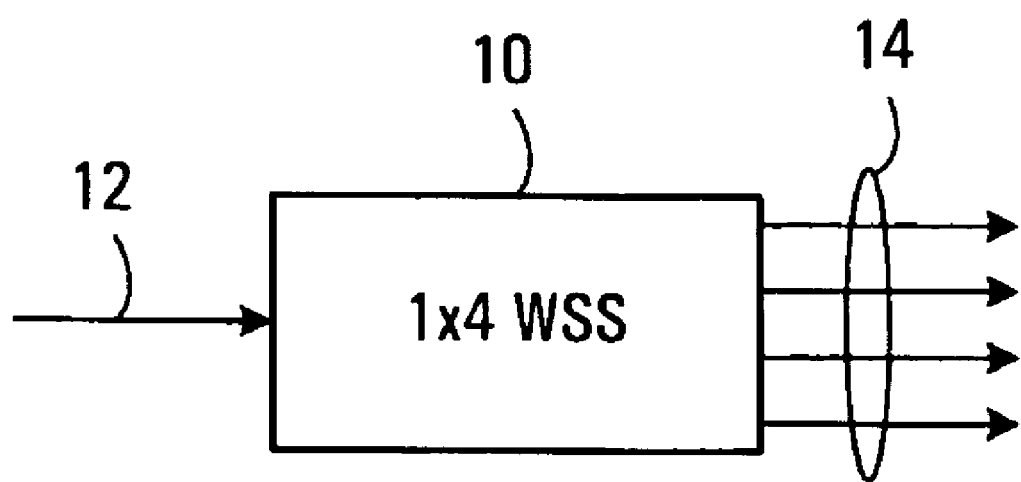
FIG. 1 is a block diagram of a wavelength selective switch.

FIG. 1 is a simple block diagram representation of a wavelength selective switch (WSS) 10. The WSS 10 has a common input port 12 and an array of "colourless" multiplexed output ports 14. Any wavelength can be routed from the input port 12 to any of the output ports 14. This is why the output ports are referred to as "colourless", namely because they are not wavelength specific. Wavelengths routed to a given colourless output port are re-combined into a single output signal for the port.

Figure 2:
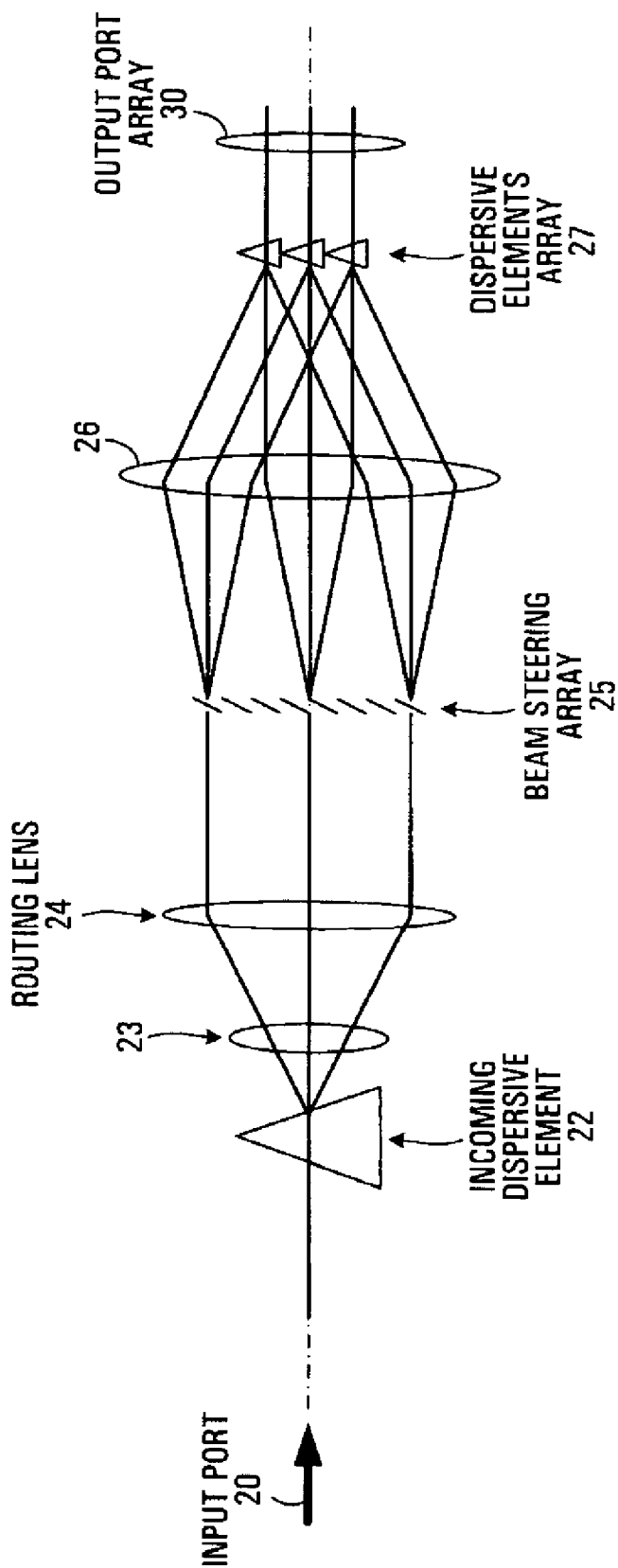
FIG. 2 is a schematic diagram of a particular wavelength selective switch.

FIG. 2 is a more detailed diagram of an example of a wavelength selective switch. This particular example is taught in Applicant's co-pending U.S. application Ser. No. 10/493,107 filed Apr. 20, 2004 claiming priority from Provisional Application No. 60/381,364 filed May 20, 2002. Both of these applications are incorporated herein by reference in their entirety. Shown is an input port 20 through which an incoming wavelength multiplex signal is received and dispersed by an incoming dispersive element 22. The dispersed signal 23 travels through a routing lens 24. After the routing lens, each of the wavelengths of the dispersed signal is travelling separately. The wavelengths are then individually steered with a beam steering array 25. Each wavelength then travels through another lens 26 and then through one of a plurality of dispersive elements in the dispersive elements array 27, with one dispersive element shown per output port. By appropriately steering the beam steering array 25, each wavelength of the incoming wavelength multiplex signal can be routed to any one of the output ports of the output port array 30.

Figure 3:
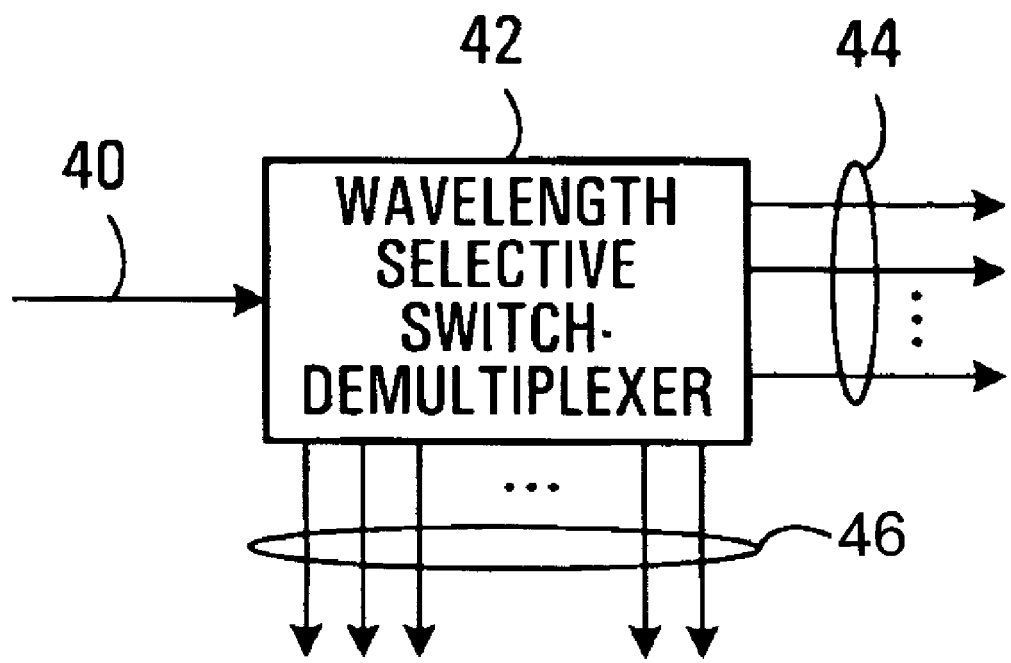
FIG. 3 is a block diagram of a wavelength selective switch-demultiplexer provided by an embodiment of the invention.

Referring now to FIG. 3, shown is a wavelength selective switch-demultiplexer provided by an embodiment of the invention. There is a single input port 40 connected to the wavelength selective switch-demultiplexer 42, a set of one or more (N) colourless/multiplexed output ports 44 and having a set (M) of coloured/demultiplexed output ports 50. The "coloured output ports" 46 are fixed wavelength demultiplexed ports: only one particular wavelength can be routed to a respective demultiplexed output port. On the other hand, the "colourless" output ports 44 can be used to output any wavelength received at the input port 40 that has been routed to the appropriate output port. This particular example will be referred to as a "lx(NM)". This is because there is one input port 40, N colourless output ports 44, and M coloured output ports 46. More generally, a similar arrangement can be produced with any number of colourless output ports and any number of coloured output ports. The WSS-demultiplexer has a wavelength selective arrangement that selectively switches each of the input wavelength channels to a respective one of a selected colourless output port and the coloured output ports. There is an optical element associated with the coloured output ports. This might for example be a bulk optical element such as a secondary routing lens. It may be a dispersive element that introduces a dispersion that is different from that associated with the input port such that there is a net dispersion. Various detailed examples of wavelength selective arrangements are provided below.

In some embodiments, the arrangement of FIG. 3 can be implemented with a 1×(N+K) WSS in which remultiplexing functionality for K (K=1 or more) of the N+K ports is either omitted, or modified such that the wavelengths stay separate and can be output at individual coloured ports. Detailed examples of this are provided below.

Also, in the example of FIG. 3 only one of the output ports of functional block 42 is connected to wavelength demultiplexed ports. In another embodiment, two or more such output ports are connected to a wavelength demultiplexed ports. This would necessitate an additional demultiplexer 48 for each such output port.

The arrangement of FIG. 3 can also be run in reverse, such that there is a set of colourless input ports, a set of coloured input ports and a single output port. The arrangement of FIG. 3 is a logical view in the sense that coloured and colourless ports are shown. Preferably the WSS-demultiplexer is of an "integrated" design in the sense that the same optical components that perform wavelength demultiplexing in the WSS-demultiplexer to enable switching to the colourless ports are used for performing the wavelength demultiplexing for the coloured ports. Detailed examples of this are presented below.

Figure 4A:
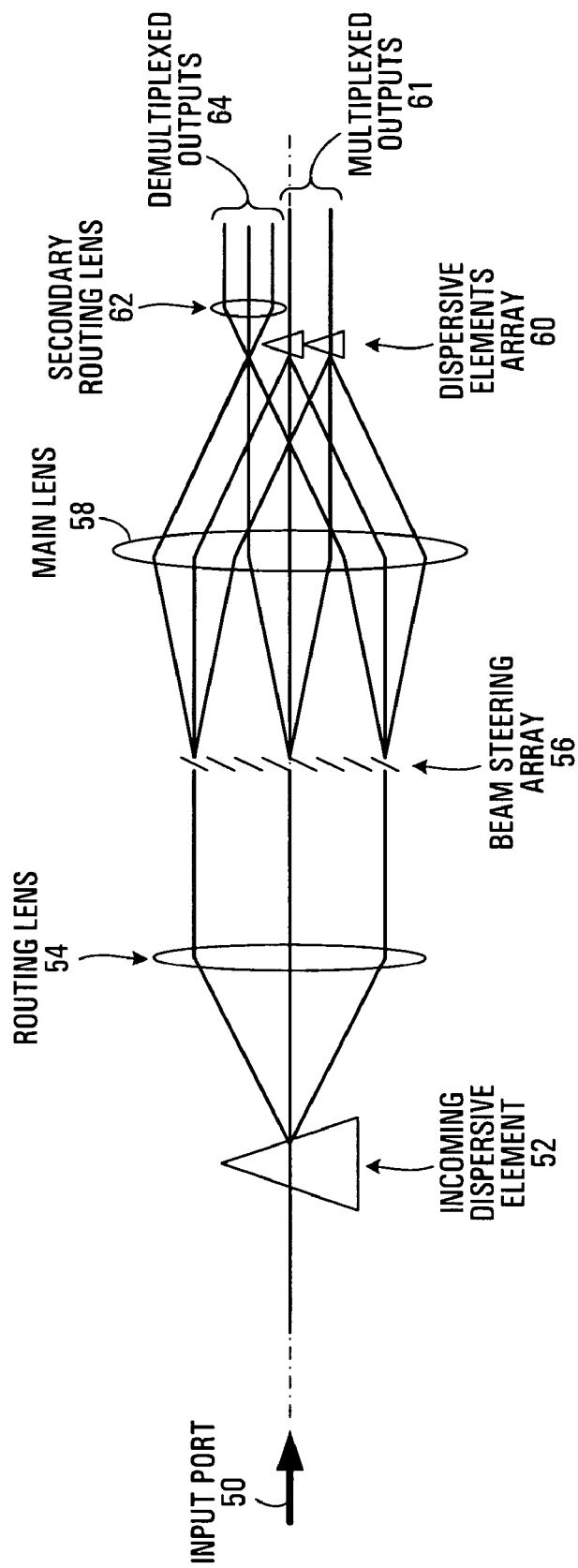
FIGS. 4A and 4B are schematic diagrams of particular wavelength selective switch-demultiplexers provided by embodiments of the invention.

Referring now to FIG. 4A, shown is a specific detailed example of a wavelength selective apparatus with demultiplexer provided by an embodiment of the invention. Shown is an input port 50 in communication with an incoming dispersive element 52. This is followed in sequence by routing lens 54, beam steering array 56, and main lens 58. There is a dispersive element array 60 that is associated with a set of multiplexed output ports 61, and there is a secondary routing lens 62 that is associated with a set of demultiplexed output ports 64.

In operation, a multi-wavelength signal arrives at the input port 50 and is dispersed at the incoming dispersive element 52. Routing lens 54 routes each wavelength to a respective beam steering element of the beam steering array 56. The beam steering elements of the array 56 steer each wavelength through main lens 58. Each wavelength can be steered so as to be dispersed by one of the dispersive elements array 60 so as to be output by a selected one of the multiplexed output ports 61. Additionally, each wavelength can be steered so as to be routed by the secondary routing lens 62 to a wavelength specific demultiplexed output port 64. It can be seen that any wavelength in the input signal can be routed to any one of the multiplexed output ports 61. Also, any wavelength in the input signal can be routed to a pre-determined one of the demultiplexed output ports 64. In other words, a given wavelength can only ever appear at a particular one of the demultiplexed output ports 64. In this sense, the demultiplexed output ports 64 are "coloured". The multiplexed outputs 61 are colourless.

Figure 4B:
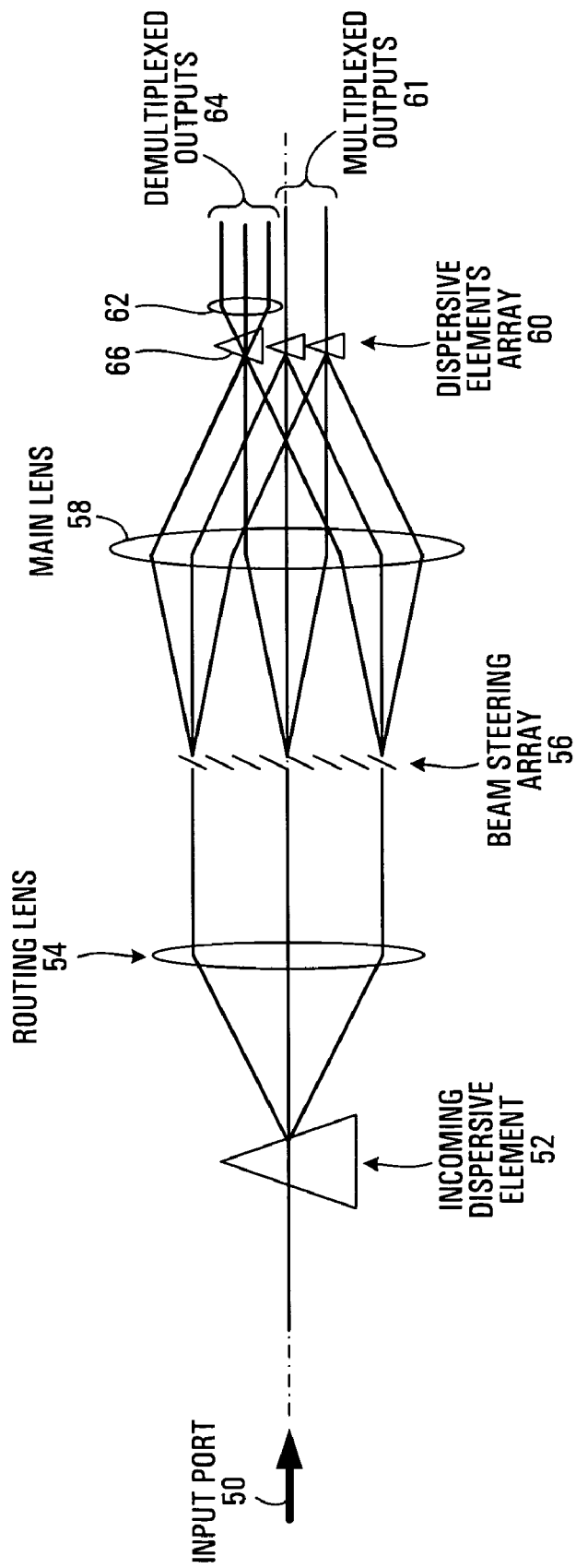

The design of FIG. 4A is an integrated design in the sense that demultiplexing occurs in the incoming dispersive elements 52, both for the purpose of producing the demultiplexed outputs (coloured) and the multiplexed (colourless) outputs. In this case, it is the absence of the second dispersion element to re-multiplex that results in the demultiplexed outputs. Another example is depicted in FIG. 4B. This is the same as FIG. 4A except that for the coloured output ports, a dispersive element 66 (shown as a prism) is provided that has a different dispersion than the output dispersive elements of array 60 such that light passing through will have a net dispersion. This passes through a routing lens 62 to produce the de-multiplexed outputs 64.

For the embodiments of FIGS. 4A and 4B, preferably, the combination of the input dispersive element array 60 and main lens 58 and the combination of the incoming dispersive element 52 and routing lens 54 have an equal and opposite dispersive effect. In a particular example, the main lens and routing lens are the same, and the incoming dispersive elements and the dispersive elements in the array 60 have equal and opposite dispersive characteristics. In another example, the main lens and the routing lens are different, and the dispersive elements for the input and output ports are also different such that the net effect is equal and opposite.

The schematics of FIGS. 4A and 4B have been simplified for clarity. They do not show input and output coupling optics that may be present. They may not accurately represent angles of incidence on the dispersive elements. Also, while a particular set of components has been shown, it is to be understood that functionally equivalent components can be substituted. For example, the incoming dispersive element 52 is shown to be a prism. However, other dispersive elements can be used instead. For example, this might be a diffraction grating or an arrayed waveguide grating. Routing lens 54 is shown to be a single spherical lens. This may be instead a combination of lenses or other bulk optical elements that achieve the same effect. In the illustrated example, the light or signal goes through the beam steering elements and as such the beam steering elements are to be considered "transmissive". In another embodiment, the beam steering elements can be arranged to be reflective instead. Any appropriate beam steering elements can be employed. For example, they might be MEMS (Micro-Eletronic Mechanical System) mirrors. Main lens 58 is shown to be a single spherical lens. Other bulk optical elements can alternatively be used. The dispersive elements array 60 is shown to consist of a respective prism for each of the multiplexed output ports 61. More generally, one or more dispersive elements can be employed. These might be diffraction gratings, arrayed waveguides or other dispersive elements as appropriate for a given implementation. While preferably a respective dispersive element per port is employed for increased efficiency, a single dispersive element may be employed for all of the multiplexed output ports 61 in other embodiments. Secondary routing lens 62 is shown to be a simple spherical lens. This may be instead a combination of lens or other bulk optical elements that achieve the same effect.

Figure 5:
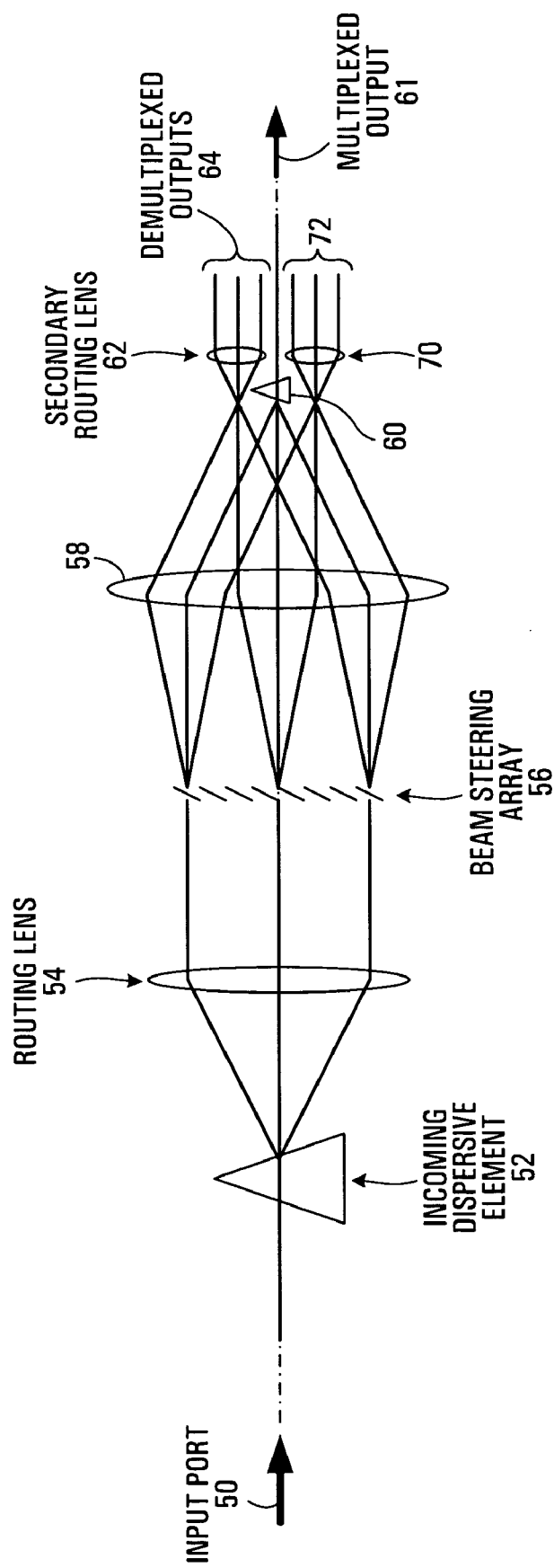
FIG. 5 is a schematic diagram of another wavelength selective switch-demultiplexer provided by an embodiment of the invention.

Also, in the illustrated example, there are two multiplexed output ports 61, and three demultiplexed output ports 64. This is for the purpose of illustration only. Any appropriate number of multiplexed output ports 61 and any appropriate number of demultiplexed output ports 64 can be implemented. Furthermore, in some embodiments, there may be multiple secondary routing lenses 62 each having a respective set of demultiplexed output ports. An example of this is shown in FIG. 5 where there is a first secondary routing lens 62 having an associated set of demultiplexed output ports 64, and a second secondary routing lens 70 having an associated set of demultiplexed output ports 72. In this case, each wavelength can be routed to the wavelengths specific port of demultiplexed output ports 64 or 72 or can be routed to the multiplexed output port 61.

In the event the wavelengths produced at a given demultiplexed output are too closely spaced, some embodiments may employ a waveguide concentrator to provide proper spacing such that the wavelengths at each output port can be separately processed.

Advantageously, with the embodiments of FIGS. 4A, 4B and 5, the majority of the functionality used in generating the multiplexed outputs has been re-used in generating the demultiplexed outputs. To produce a set of demultiplexed outputs the dispersive elements array 60 is changed such that only some of the outputs are re-multiplexed and a secondary routing lens is provided for one or more sets of demultiplexed output ports.

Figure 6A:
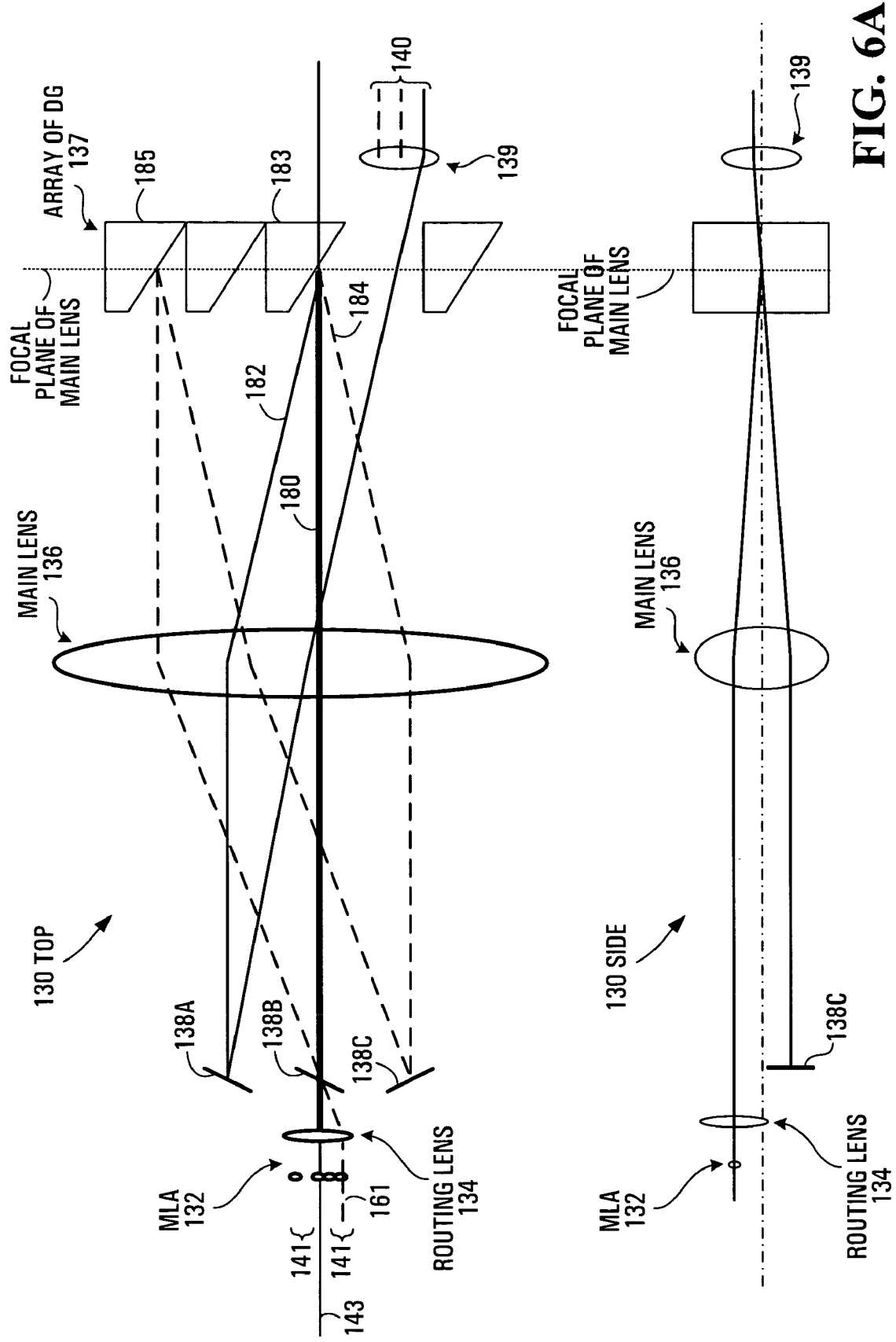
FIG. 6A is a schematic diagram of another wavelength selective switch-demultiplexer provided by an embodiment of the invention.

Referring now to FIG. 6A, shown is a system block diagram of a free-space embodiment of a wavelength selective optical switch with an integrated demultiplexer provided by the invention. This embodiment employs an array of reflective diffraction gratings instead of prisms as employed in the previous embodiments. More generally, non-transmissive dispersive elements can be employed with this arrangement. The figure shows a set of MLA's (microlens array) 132 each of which is associated with a light port (one input port 143 and three colourless output ports 141), the input/output of which passes through a routing lens 134. The top view of the device is generally indicated at 130 TOP and the side view is generally indicated at 130 SIDE.

The output of the routing lens 134 passes through free-space to a main lens 136 which routes light from the input port 143 to a diffraction grating 183 forming part of an array of diffraction gratings 137. The array of diffraction gratings includes a diffraction grating for the input port, and a diffraction grating for each of one or more colourless output ports. In the illustrated example, there are four diffraction gratings in the array 137, three of which are for three colourless output ports 141. The array of diffraction gratings reflects the incoming light of each port according to wavelength. There is an array of switching elements 138 shown to consist of tiltable mirrors 138A, 138B and 138C, although likely there would be more mirrors than shown. More generally, there is a respective switching element for each wavelength channel to be switched. It is noted that the switching elements 138 are not in the same horizontal plane as the routing lens 134. This can be most clearly seen in the side view 130 SIDE. Each switching element performs a switching of light of a given wavelength from one input port to another optical port by tilting of the mirror. Also shown is a secondary routing lens 139 that has an associated set of demultiplexed or coloured output ports 140.

The operation of FIG. 6A is similar to that of previous embodiments. One of the ports is designated as an input port and the other ports are output ports. By appropriate tilting of the mirrors in array 138, each wavelength of a multi-wavelength input signal received at the input port 143 can be switched to any of the colourless output ports 141 via the MLA 132 or to the coloured output ports via the lens 139. If routed to a colourless output port 141, wavelengths are combined in a colourless output. If routed to a coloured output port, each wavelength goes to the pre-determined coloured port of the set 140.

In the illustrated example, beam 180 represents an input multi-wavelength signal received at input port 143. This is demultiplexed by dispersive element 183 to produce beams 182,184. Beam 182 travels through main lens 136, and is redirected by switching element 138A back through the main lens 136 to the set of coloured output ports 140 where it is output on a wavelength channel specific output port. Beam 184 travels through main lens 136, and is redirected by switching element 138C back through the main lens 136 to dispersive element 185 from where the beam is directed back through the main lens 136 to a output port 161 of the colourless output ports 141.

The examples of FIGS. 4A, 4B, FIGS. 5, and 6A are one-dimensional arrangements in the sense that there is a linear array of ports at the output, these being either the multiplexed output ports or the demultiplexed output ports. In another embodiment, a two dimensional arrangement of ports is provided at the output, and some of the ports are colourless and some of them are coloured. An example of a wavelength selective switch with two-dimensional array of output ports has been taught in the above-incorporated applications. In order to produce an integrated selective switch with integrated demux, a secondary routing lens can be employed at any of the output ports at the two dimensional array to produce a set of demultiplexed outputs.

One such two dimensional embodiment is similar to that of FIG. 6A except that in this case, there is a two dimensional array of ports, generally optically connected through a routing lens to the main lens and a two dimensional array of diffraction gratings. Switching/routing is performed using routing elements. In this case by replacing any one or more of the diffraction gratings in the 2D array with a secondary routing lens, a respective set of demultiplexed output ports is realized. An example is shown in FIG. 6B.

Figure 6B:
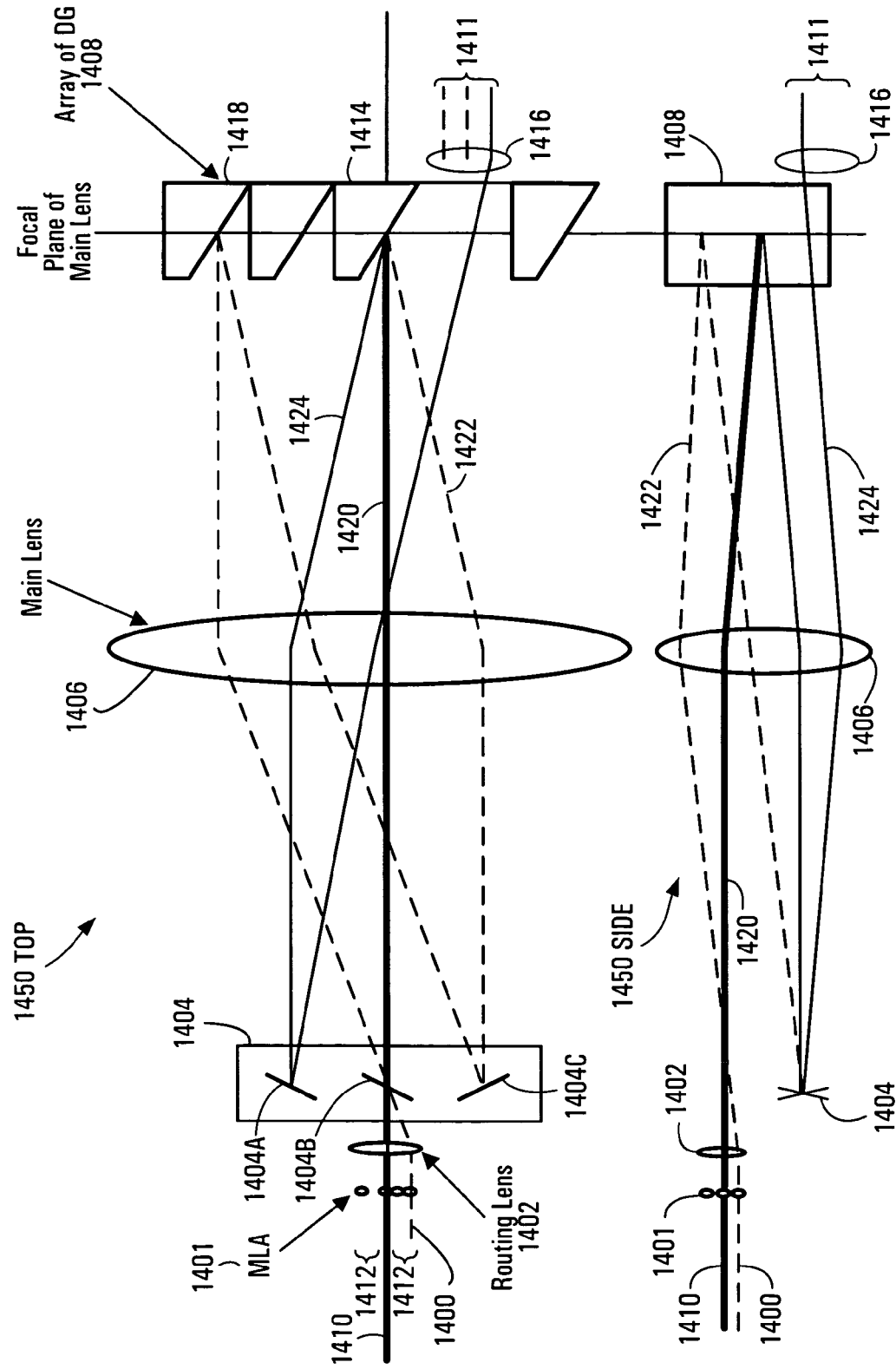
FIG. 6B is a schematic diagram of another wavelength selective switch-demultiplexer provided by an embodiment of the invention.

Referring now to FIG. 6B, shown is a system block diagram of a free-space embodiment of a wavelength selective optical switch with an integrated demultiplexer provided by the invention, with a top view generally indicated at 1450 TOP and a side view generally indicated at 1450 SIDE. This embodiment again employs an array of reflective diffraction gratings instead of prisms as employed in the previous embodiments. More generally, non-transmissive dispersive elements can be employed with this arrangement. The figure shows a two dimensional microlens array 1401 each of which associated with a light port (one input port 1410 and one or more multiplexed output ports 1412), the input/output of which passes through a routing lens 1402.

The output of the routing lens 1402 passes through free-space to a main lens 1406 which routes light from the input port 1410 to a diffraction grating 1414 forming part of an array of diffraction gratings 1408. In the illustrated example, the array of diffraction gratings includes a respective diffraction grating for each row of ports in the two dimensional array of ports. In the illustrated example, there is a single set of coloured ports 1411 having associated secondary routing lens 1416. Thus, there are four diffraction gratings in the array 1408, three of which are for three rows of multiplexed output ports 1412. The array of diffraction gratings reflect the incoming light of each port according to wavelength. There is an array of switching elements 1404 shown to consist of tiltable mirrors 1404A, 1404B and 1404C, although likely there would be more mirrors than shown. The switching elements 1404 tilt in two dimensions. There would be a respective switching element for each wavelength channel. It is noted that the switching elements 1404 are not in the same horizontal plane as the routing lens 1402. This can be most clearly seen in the side view 1450 SIDE. Each switching element 1404 performs a switching of light of a given wavelength from one input port to another optical port by tilting of the mirror.

The operation of FIG. 6B is similar to that of previous embodiments except that switching in two dimensions is now possible. One of the ports is designated as an input port and the other ports are output ports. By appropriate tilting of the mirrors in array 1404, each wavelength of a multi-wavelength input signal received at the input port 1410 can be switched to any of the multiplexed output ports 1412 (either in the same row as the input port or in another row) via the MLA 1401 or to the de-multiplexed output ports 1411 via the secondary lens 1416. If routed to a multiplexed output port 1412, wavelengths are combined in a colourless output. If routed to a demultiplexed output port 1411, each wavelength goes to the pre-determined coloured port of the set 1411.

In the illustrated example, beam 1420 represents an input multi-wavelength signal received at input port 1410. This is demultiplexed by dispersive element 1414 to produce beams 1422,1424. Beam 1424 travels through main lens 1406, and is redirected by switching element 1404A back through the main lens 1406 to the set of coloured output ports 1411 where it is output on a wavelength channel specific output port. Beam 1422 travels through main lens 1406, and is redirected by switching element 1404C back through the main lens 1406 to dispersive element 1418 from where the beam is directed back through the main lens 1406 to a particular colourless output port 1400 of the colourless output ports 1412.

In the illustrated example, there is a single set of coloured output ports 1411 and as such, a single secondary routing lens 1416. More generally, there may be multiple sets of coloured output ports. For the particular example of FIG. 6B, there can be a row of sets of coloured output ports in place of the diffraction element in the array of diffraction elements that would normally serve a row of colourless output ports. Each set would have a respective secondary routing lens.

Furthermore, while in the illustrated example, there is a respective diffraction grating for each row of ports, in another implementation there can be a respective diffraction grating per port, or a mix of diffraction gratings per port and diffraction gratings per row of ports.

A two dimensional embodiment can also be realized using waveguide dispersive elements. In that case, a row of dispersive elements can be implemented together on a waveguide device. A stacked arrangement of such devices provides a dispersive element per port in a 2-D array. One or more sets of coloured ports are provided, either by providing a dispersive element having different dispersion characteristics (as described in detail below with reference to FIG. 8 for a single waveguide dispersive device), or by routing light out of the plane of the dispersive elements for output at colourless ports (as described in detail below with reference to FIG. 7 for a single waveguide dispersive device).

The above-described embodiments have employed either prisms or diffraction gratings as the dispersive elements. It is noted that any appropriate diffraction grating type might be employed. For example reflective, transmissive, echelle, echellon, or grisms, to name a few examples. Array waveguides and echelle waveguide gratings might be employed. More generally, any dispersive element that can achieve the desired wavelength dependent function may be employed by embodiments of the invention.

The described embodiments have featured MEMS mirror arrays to perform the switching of wavelengths. More generally, any appropriate switching elements may be used. For example, a tiltable micro-mirror, liquid crystal beams steering elements (phase array), accouto-optic beam deflectors, solid-state phase array, controllable holograms, periodically polled Lithium Niobate beam deflectors.

Figure 7:
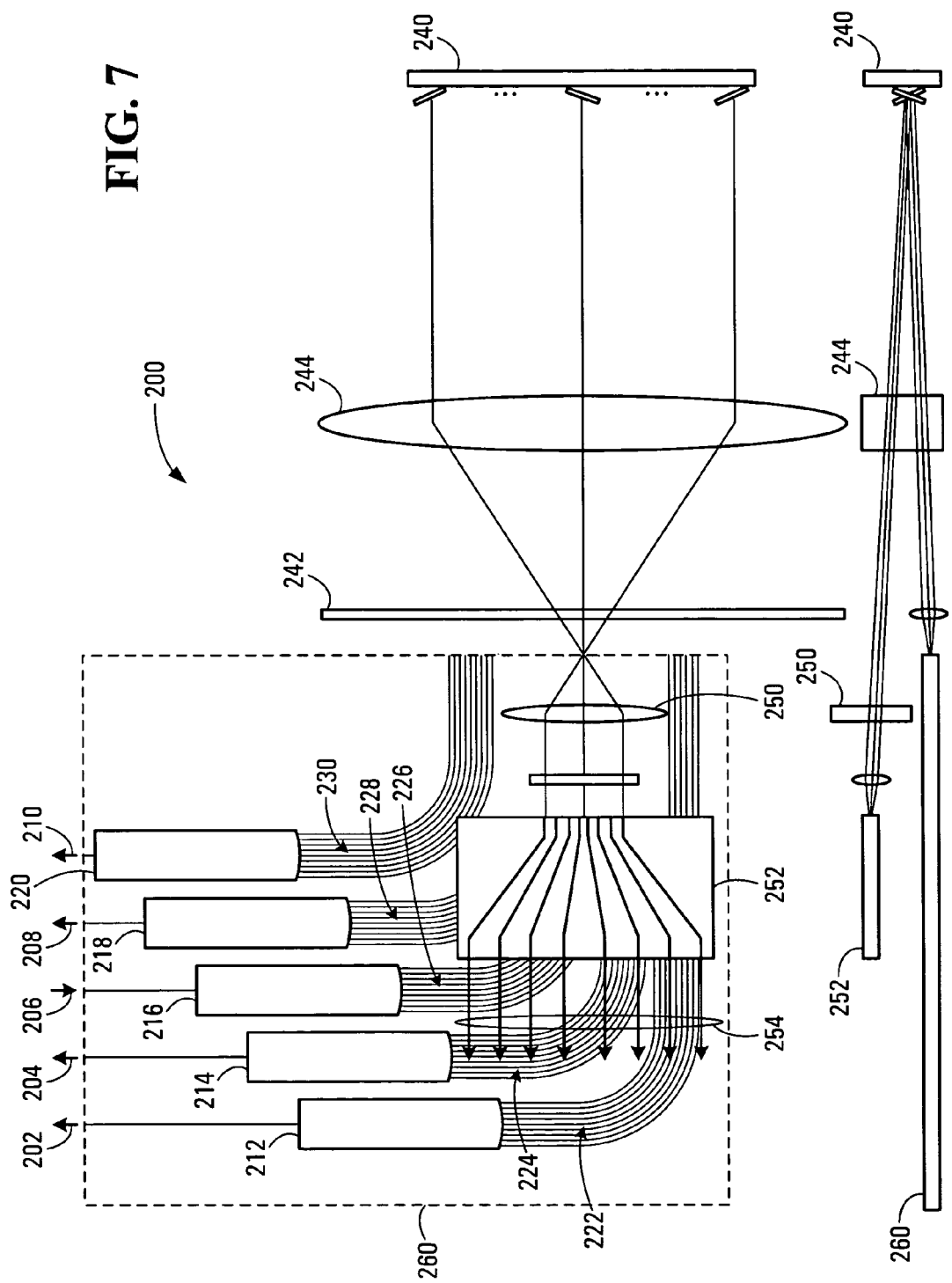
FIG. 7 is a schematic diagram of another wavelength selective switch-demultiplexer featuring waveguide based dispersive elements, provided by an embodiment of the invention.

FIG. 7 shows the top view and a side view of another embodiment of the invention generally indicated at 200. A set of ports 202, 204, 206, 208, 210 are provided which are connected through integrated coupling optics to waveguide arrays that form waveguide dispersive elements. In this example, the integrated coupling optics are designated with reference numerals 212, 214, 216, 218, 220 and the waveguide arrays are designated as 222, 224, 226, 228, 230, forming part of a waveguide device 260. An appropriate phase profile is inside each waveguide dispersive element. In the case of a waveguide array, this is usually achieved with a linear phase term to provide adequate dispersion. Such a dispersive arrangement of a waveguide element is described, for example, in: M. K. Smit, Electronics Letters, Vol. 24, pp. 385–386, 1988. Light is collimated and focussed with collimating and focussing lenses 242,244 respectively. With the arrangement described thus far, a multi-wavelength signal arriving at input port 206 will undergo dispersion such that each wavelength is routed to a respective one of the routing elements in the array of routing elements 240. Each wavelength can be individually switched to one of the multiplexed output ports 202,204,208,210 via the associated dispersive elements 222,224,228,230. Thus, the signals output at ports 202,204,208,210 are colourless using the terminology introduced earlier. According to this embodiment, the switching elements forming part of the array 240 are switchable in two dimensions. They can switch so as to switch light to any of the multiplexed output ports as described. Furthermore, they can switch in the vertical direction to switch the light so as to be output by a demultiplexed port. The demultiplexed ports are achieved by providing a secondary routing lens 250 out of the plane of device 260. This results in each of the wavelengths being routed to a wavelength specific output port. Waveguide concentrator 252 is shown to increase the spacing between output ports such that each wavelength can be extracted separately. The set of demultiplexed output ports is indicated at 254. Thus, to route a wavelength to a demultiplexed output port, the wavelength follows a similar path initially, travelling through the input port 206, integrated coupling optics 216 and input dispersive element 226 through the collimating and focussing lenses 242,244 and on to the array of switching elements. There is one switching element per wavelength channel. For wavelengths that are switched out to a multiplexed output port, these are only switched in the horizontal direction and the wavelength goes out through a selective one of output ports 202,204,208,210. For the wavelength that is to go through a demultiplexed port, the appropriate switching element in the array 240 is switched in the vertical direction to cause the wavelength to be routed through the secondary lens 250 and then on through the appropriate demultiplexed output port, each such port being wavelength specific.

With the embodiment of FIG. 7, the demultiplexed output ports are not produced using the same waveguide device 260 as the multiplexed ports. Rather, they are produced using the secondary routing lens 250 that is implemented externally to the waveguide device 260. In another embodiment, the demultiplexed output ports are provided on the same waveguide device. An example of this will now be described with reference to FIG. 8. Shown is an input port 301, colourless output ports 302,303,304, and coloured output ports 305. The input port 301 is connected through integrated coupling optics 308, to a waveguide based dispersive element 312. The three colourless output ports 302,303,304 each also connected to a respective integrated coupling optics 310 and to a respective waveguide based dispersive element 312. Only three colourless ports are shown in this figure, but any other number is within the scope of this embodiment. The coloured output ports 305 are connected via integrated waveguide concentrator 320 to integrated coupling optics 322 and then to waveguide based dispersive element 324. The waveguide based dispersive elements 312 and 324 have a different amount of dispersion such that wavelengths passing through waveguide dispersive element 312 and 324 in sequence experience a non-zero net dispersion, while wavelengths passing twice through waveguide dispersive element 312 experience substantially no net dispersion. As in the embodiment of FIG. 7, the end of the waveguide based dispersive elements not connected to the integrated coupling optics are in optical communication with collimating and focussing lenses 242,244 after which is located the switching array 240.

In operation, the dispersive element 312 associated with the input port 301 disperses all the wavelength channels received at the input port to the appropriate wavelength specific switching element in the array 240 via the collimating and focussing lenses 242,244. The switching elements switch each wavelength to a selected one of dispersive elements 312 for colourless output ports or to dispersive element 324 for coloured output ports. The dispersive elements 312 associated with the colourless output ports 302, 303,304 re-multiplex wavelengths back to the associated colourless output port. This complete re-multiplexing occurs because of the fact that the dispersive elements for these colourless output ports are substantially identical to the dispersive elements for the input port. On the other hand, the dispersive element 324 associated with the coloured output port 305 has some amount of dispersion different from that of the other dispersive elements such that there is a net remaining dispersion after a wavelength is coupled back through the dispersive element 324 and integrated coupling optics 322. This means that the wavelengths at the output of device 322 are still separated by some small amount. Waveguide concentrator 320 separates the individual wavelengths into individual waveguides that are connected through to the coloured output ports 305.

The difference in the dispersion of the dispersive element for the colourless ports and the dispersive element for the coloured ports needs to be great enough such that it is possible to resolve individual channels for coloured outputs 305. The physical implementation of device 300 shown in the arrangement of FIG. 8 features all of the dispersive elements in a single device, and this will potentially put limitations on the difference between the dispersion of the different elements simply by the physical geometry. If the difference is too great, it may not be possible to implement all of the devices on a single waveguide device.

Figure 8:
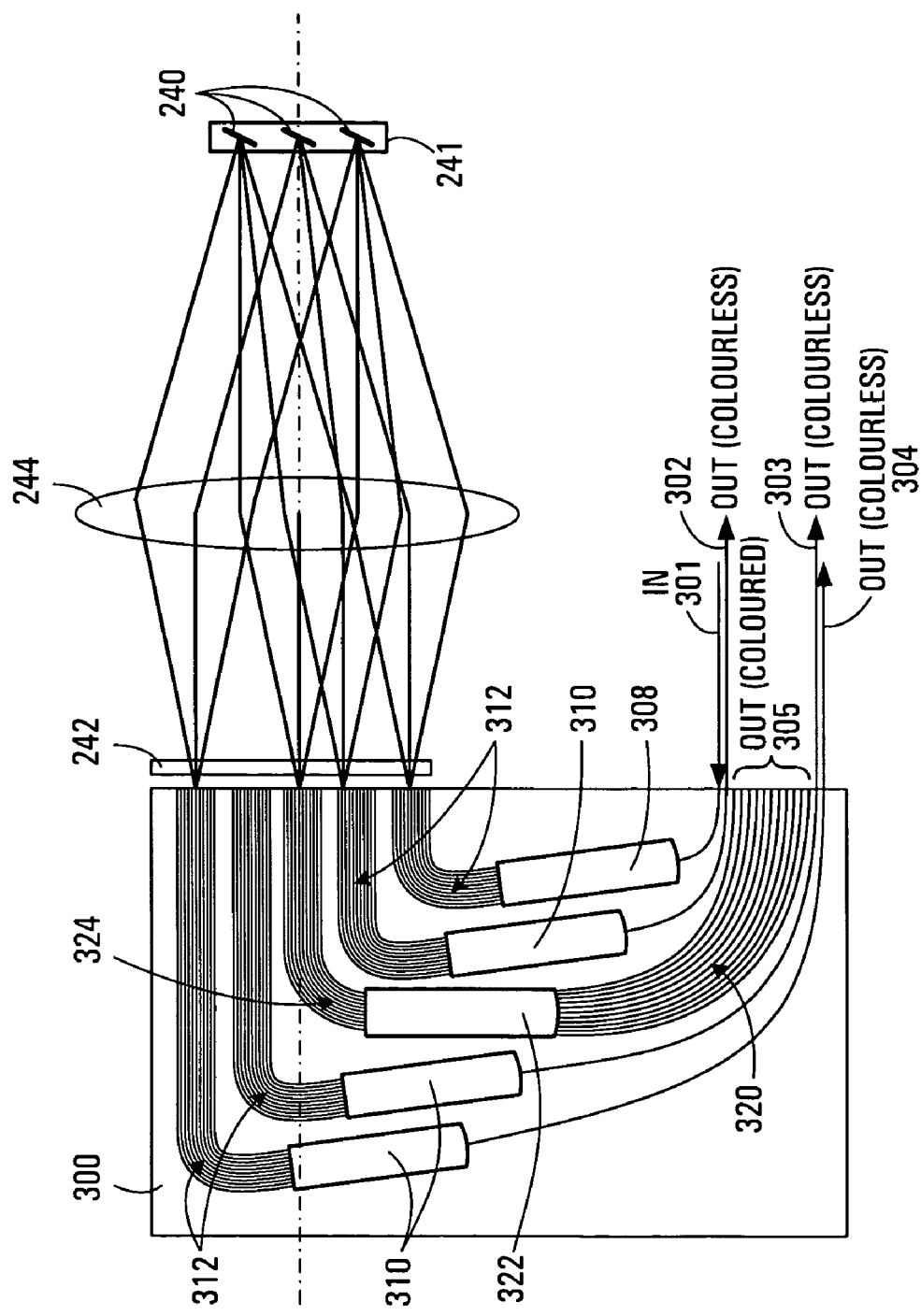
FIG. 8 is a schematic diagram of another wavelength selective switch-demultiplexer featuring waveguide based dispersive elements integrated on a single device for both coloured output ports and colourless output ports in accordance with another embodiment of the invention.

In the example implementation of FIG. 8, there are three colourless output ports and one set of coloured output ports. More generally, any appropriate number of colourless output ports and sets of coloured output ports can be provided by appropriately scaling the number of dispersive elements in device 300. Furthermore, the number of switching elements in the array 240 will scale according to the number of wavelength channels that need to be switched. A two dimensional embodiment is realized by stacking devices like device 300 and providing switch elements that switch in two dimensions. Another embodiment provides device 300 on its own scaled according to a selected number of coloured output ports and of colourless output ports.

In one example, the order of the input dispersive elements and the dispersive elements for the colourless output ports is 33, whereas the order is 20 for the dispersive element for the coloured output ports. This is simply an example and of course any appropriate numbers can be used.

In a preferred embodiment, an athermal mount 241 is provided for the array of switching elements 240. This athermal mount moves the array of switching elements up and down as a function of temperature to compensate for changes in the dispersive characteristics of the dispersive element of the input port as a function of temperature.

The examples described have been specific to one input port and multiple multiplexed output ports and a single set of demultiplexed output ports. More generally, any number of ports of each type can be provided. Furthermore, a two dimensional array of ports can be provided in combination with one or more sets of demultiplexed output ports while preferably a MEMS mirror array is used for the switching elements, any appropriate switching element technology can be employed.

The examples described feature a single input port and multiple output ports. It is to be understood that any of the embodiments described can be operated in reverse such that the single input port is an output port, and the output ports are input ports.

Numerous modifications and variations of the present invention are possible in light of the above teachings. It is therefore to be understood that within the scope of the appended claims, the invention may be practiced otherwise than as specifically described herein.

We claim:

1. An apparatus comprising:
   an input port for launching an input signal including a plurality of wavelength channels;
   an input dispersive element for demultiplexing the input signal into wavelength channels;
   at least one colourless output port, each colourless output port for outputting a respective multiplexed output signal containing a combination of all wavelength channels switched to that colourless output port;
   at least one output dispersive element, each outgoing dispersive element for multiplexing the wavelength channels switched to a respective colourless output port into a respective multiplexed output signal;
   a plurality of coloured output ports, each for outputting only a respective predetermined demultiplexed wavelength channel switched to that coloured output port;
   an optical element associated with the plurality of coloured output ports;
   a wavelength selective arrangement adapted to selectively switch each of the plurality of wavelength channels of the input signal to a respective one of:
   a) the at least one output dispersive element for multiplexing the selected wavelengths, and directing the multiplexed output signal to a selected colourless output port;
   b) the optical element, which then routes the demultiplexed wavelength to the coloured output port of the plurality of coloured output ports that outputs that wavelength.

2. The apparatus of claim 1, wherein the optical element comprises a secondary routing lens.

3. The apparatus of claim 1 wherein the at least one colourless output port comprises a plurality of colourless output ports.

4. The apparatus of claim 1, wherein the input and output dispersive elements are waveguide dispersive elements.

5. The apparatus of claim 1, wherein the input dispersive element has substantially similar dispersion characteristics to each of the output dispersive elements, and wherein the optical element comprises a second output dispersive element having a different dispersive characteristic from the input dispersive element, such that a net dispersion exists after light is dispersed by the input dispersive element and the second output dispersive element.

6. The apparatus of claim 5, wherein each of the input and output dispersive elements is a waveguide dispersive element.

7. The apparatus of claim 6, wherein the wavelength selective arrangement comprises an array of switching elements switchable in two dimensions; wherein the input port, the colorless output ports, and the waveguide dispersive elements of the input and output dispersive elements are in a first plane; and wherein the coloured output ports are in a second plane; whereby the switching elements direct light in the first plane between the input port and the colorless output ports, and the switching elements direct light from the first plane to the second plane when directing light between the input port and the coloured output ports.

8. An integrated optical waveguide device comprising:
an input arrayed waveguide having a first dispersion for launching an input signal including a plurality of wavelength channels,
a plurality of first output arrayed waveguides each having substantially the first dispersion;
for each of the plurality of first output arrayed waveguides, a respective first integrated optics coupling element adapted to couple light between the first output arrayed waveguide and a respective colourless output port;
a second output arrayed waveguide having a second dispersion differing from said first dispersion;
for the second output arrayed waveguide, a second integrated optics coupling element adapted to couple light between the second output arrayed waveguide and a plurality of coloured output ports;
a plurality of routing elements for directing the wavelength channels from the input signal dispersed by the input arrayed waveguide to the first or second output arrayed waveguides;
wherein, for each first output arrayed waveguide, the wavelength channels directed thereto are multiplexed and output the respective colorless output port; and
wherein the first dispersion and the second dispersion differ enough such that after passing through the input arrayed waveguide, the second output arrayed waveguide and the second integrated optics coupling element, selected wavelength channels have a physical separation such that each wavelength channel is coupled to a respective one of the plurality of coloured output ports.

9. The waveguide device of claim 8 wherein each first integrated coupling optics comprises a respective substantially non-dispersive waveguide coupled to a slab waveguide.

10. The waveguide device of claim 8 wherein the second integrated coupling optics comprises a plurality of substantially non-dispersive waveguides coupled to a slab waveguide.

11. An apparatus comprising:
an input optical port for receiving an input optical signal including a plurality of wavelength channels;
at least one colourless output optical port;
at least one coloured output optical port;
an incoming dispersive element optically connected to the input optical port for demultiplexing the input optical signal;
at least one outgoing dispersive element optically connected to the at least one colourless output optical port for multiplexing selected wavelength channels;
a bulk optical element having optical power;
a plurality of reflective routing elements;
wherein for each wavelength channel:
the incoming dispersive element and the bulk optical element disperses the wavelength channel towards a respective one of said plurality of routing elements, and the respective one of said plurality of routing elements directs the wavelength channel via the bulk optical element to a selected colourless output port via the respective outgoing dispersive element of the selected colourless output port or to a selected coloured output port, the selected colourless output port or the selected coloured output port being determined by the respective routing element;
whereby wavelength channels routed to a given colourless output port are re-combined into a single multiplexed output signal for output the colourless port, and each wavelength channel routed to a given coloured output port remains demultiplexed and appears at the wavelength specific coloured port.

12. The apparatus of claim 11 wherein said at least one colourless output port comprises at least two colourless output ports.

13. The apparatus of claim 11, wherein the incoming and outgoing dispersive elements are transmissive and are between the input and output optical ports and the bulk optical element having power.

14. The apparatus of claim 11, comprising a respective outgoing dispersive element for each colourless output port.

15. The apparatus of claim 11, comprising a single outgoing dispersive element for the colourless output ports.

16. The apparatus of claim 11, wherein each of the incoming and outgoing dispersive elements comprises an array of waveguides having a predetermined first optical path length difference spread across the array.

17. The apparatus of claim 16, wherein the reflective routing elements comprise an array of switching elements switchable in two dimensions; wherein the input port, the colorless output ports, and the array of waveguides for the incoming and outgoing dispersive elements are in a first plane; and wherein the coloured output ports are in a second plane; whereby the switching elements direct light in the first plane between the input port and the colorless output ports, and the switching elements direct light from the first plane to the second plane when directing light between the input port and the coloured output ports.

18. The apparatus of claim 16, wherein the at least one colored output port includes a coloured dispersive element comprising an array of waveguides having a predetermined second optical path length difference spread across the array associated with the coloured output ports, the first and second optical path length difference being different.

19. The apparatus of claim 18, wherein the incoming, outgoing and coloured dispersive elements are collectively integrated onto a single waveguide device.

20. The apparatus of claim 11 further comprising microoptics coupling elements adapted to couple light from each port to/from the respective dispersive element.

21. The apparatus of claim 18 further comprising integrated optical coupling elements adapted to couple light from each port to/from the respective dispersive element.

22. The apparatus of claim 11, wherein each of the incoming and outgoing dispersive elements comprises a transmissive diffraction grating.

23. The apparatus according to claim 11 wherein the incoming and outgoing dispersive elements and the routing elements are placed substantially at focal planes of the bulk optical element having optical power.

24. The apparatus according to claim 11, wherein the incoming and outgoing dispersive elements are integrated on a waveguide substrate, and the bulk optical element having optical power comprises a main cylindrical lens element adapted to focus light in a first plane in the plane of the waveguide substrate, the apparatus further comprising a transverse cylindrical lens adapted to substantially collimate light in a second plane perpendicular to the first plane.

25. The apparatus according to claim 24, wherein the main cylindrical lens has a focal length such that the outgoing dispersive elements are in a focal plane of the lens on a first side of the lens, and the routing elements are in a focal plane of the lens on a second side of the lens.

26. The apparatus of claim 11, wherein the incoming and outgoing dispersive elements are selected from a group comprising: echelle grating, echellon gratings, prisms, and arrayed waveguides.

27. The apparatus of claim 11 wherein each routing element is a tiltable micro-mirror.

28. The apparatus of claim 18, further comprising: an athermal mount for the routing elements adapted to shift the routing elements to compensate for changes in dispersive characteristics of the incoming dispersive element as a function of temperature.

29. The apparatus of claim 11, wherein the incoming and outgoing dispersive elements comprise non-transmissive diffraction gratings, and wherein a secondary lens is used to route light to the coloured output ports.

30. The apparatus of claim 11, wherein each routing element is one of a liquid crystal beam steering element, an acousto-optic beam deflector, part of a solid state phase array, a controllable hologram, and a periodically polled Lithium Niobate beam deflector.

31. The apparatus of claim 11, further comprising a secondary lens associated with each set of coloured output ports that routes each selected wavelength channel to one of the wavelength specific coloured output ports.

32. The apparatus of claim 11, further comprising a coloured dispersive element associated with each set of coloured output ports that has a different dispersion characteristic from the incoming dispersive element, such that a net dispersion remains after being dispersed by a combination of the incoming dispersive element and the coloured dispersive element.

33. An arrangement comprising:
at least one input port, at least one input dispersive element associated with the at least one input port;
at least one colourless output port, at least one output dispersive element being associated with the at least one colourless output port;
at least one set of coloured output ports;
at least one bulk optical element;
for each of a set of wavelength channels, a respective switching element adapted to redirect the wavelength channel;
wherein the dispersive elements, the at least one bulk optical element and the switching elements are arranged to:
demultiplex wavelength channels received at the at least one input port;
redirect each wavelength channel towards one of a selected colourless output port or a selected set of coloured output ports;
for each colourless output port, remultiplex any wavelength channels routed towards the colourless output port;
for each set of coloured output ports, output wavelength channels individually without remultiplexing.

34. A method comprising:
using an input dispersive element, demultiplexing a multi-wavelength input signal into a plurality of wavelength channels;
using a combination of switching elements and at least one bulk optical element, routing each of the plurality of wavelength channels to: a selected one of a plurality of colourless output ports via a dispersive element associated with the selected colourless output port; or a selected set of at least one set of coloured output ports;
wherein for each colourless output port, any wavelengths routed to the colourless output port are combined to produce a colourless output;
wherein for each set of coloured output ports, any wavelengths routed to the set of coloured output ports are output on wavelength channel specific output ports of the set.

* * * * *